United States Patent [19]
Kurashige et al.

[11] Patent Number: 5,481,660
[45] Date of Patent: Jan. 2, 1996

[54] IMAGE CONVERTING APPARATUS

[75] Inventors: Masafumi Kurashige; Shinichi Fukushima; Ayumi Nakao, all of Kanagawa, Japan

[73] Assignee: Sony Corporation, Tokyo, Japan

[21] Appl. No.: 43,543

[22] Filed: Apr. 6, 1993

[30] Foreign Application Priority Data

Apr. 11, 1992 [JP] Japan ................................. 4-118402

[51] Int. Cl.⁶ ................................................ G06T 3/00
[52] U.S. Cl. ................................. 395/125; 395/130
[58] Field of Search ................................ 395/125, 127, 395/130

[56] References Cited

U.S. PATENT DOCUMENTS

| | | | |
|---|---|---|---|
| 4,831,445 | 5/1989 | Kawabe | 395/125 X |
| 5,204,944 | 4/1993 | Wolberg et al. | 395/127 |

FOREIGN PATENT DOCUMENTS 0437074  7/1991  European Pat. Off. .

OTHER PUBLICATIONS

Patent Abstracts of Japan vol. 16, No. 579 (E–1299) 18 Dec. 1992 & JP–A–42 27 172 (NEC Corp.) 17 Aug. 1992.
Patent Abstracts of Japan vol. 13, No. 468 (E–834) 23 Oct. 1989 & JP–A–11 83 277 (NEC Corp) 21 Jul. 1989.
Patent Abstracts of Japan vol. 11, No. 27 (E–474) 27 Jan. 1987 & JP–A–61 196 681 (Sony Corp) 30 Aug. 1986.

Primary Examiner—Mark K. Zimmerman
Attorney, Agent, or Firm—William S. Frommer; Alvin Sinderbrand

[57] ABSTRACT

In an image transforming apparatus for transforming an input image into a wavering output image, an attenuation standard position and an attenuation range measured from the attenuation standard position are selected and three-dimensional shape data are generated for representing a shape based on the produced transform address data by adding the address data of the input image to an offset value changing in accordance with a predetermined cyclic function. Then, an attenuation value is generated within the attenuation range, and the attenuation value changes in accordance with the distance from the attenuation standard position. The offset value is weighted by this attenuation value and the input image is mapped on the shape such that the amplitude of a ripple varies in accordance with the distance from the attenuation standard position. When the attenuation value is set to a constant value, and the offset value is weighted and such attenuation value, the input image is mapped on the shape such that the amplitude of a ripple is kept to a constant value even when the distance from the attenuation standard position changes.

13 Claims, 5 Drawing Sheets

IMAGE CONVERTING APPARATUS

FIELD OF THE INVENTION

This invention relates to an image transforming apparatus, which, for example, provides a special effect with television signals.

BACKGROUND OF THE INVENTION

A special effect system for achieving a special effect with television signals was proposed, for example in U.S. Pat. No. 4,965,844, in which a television signal is digital-signal-processed to display the image, as if the input image has been pasted (hereinafter referred to as "mapped") on a three-dimensional curved surface (for instance, on a cylinder or a wine glass, etc., referred to as a "shape").

In a method of this type of image transform, at first, the input image is divided into blocks having a predetermined size, and the image data of each block are stored progressively in predetermined addresses of a memory according to predetermined write address data.

At the same time, a predetermined calculation is executed with respect to the addresses of stored input image data prior to transform based on the transform-input-data inputted by an operator using separate input means, thus obtaining the read addresses of the input image data stored in the memory.

The read address is calculated so that an output image which looks as if the inputted image has been mapped onto a predetermined shape can be obtained when the output image is assembled with raster scan, and in accordance with this read address, the image data of a block stored in a predetermined address in the memory is read out. Thus, a two-dimensional plane output image, which looks as if the input picture has been mapped onto a predetermined shape, can be outputted.

In the image transform, by enabling the formation of a shape such as a ripple spreading over a water surface, it would be more convenient to map various input images.

At this time, if the shape on which the image is mapped can be formed such that the amplitude of the ripple or wave becomes smaller as it goes farther from the point at which the ripple originates, a more realistic looking image can be synthesized.

SUMMARY OF THE INVENTION

In view of the foregoing, an object of this invention is to provide an image transforming apparatus in which an image of a ripple spreading over a water surface can be synthesized with a simple procedure.

The foregoing object and other objects of the invention have been achieved by the provision of an image transforming apparatus for transforming an input image to an output image having the input image mapped on a three-dimensional shape, such as a ripple, in which, an attenuation standard position and an attenuation range measured from the attenuation standard position are set for the ripple, and the output image is represented by transform address data produced by adding address data of the input image to an offset value which changes in accordance with a predetermined cyclic function of the distance from the attenuation standard position within the attenuation range. Then, an attenuation value, changing in accordance with the distance from the attenuation standard position, is set and the offset value is weighted with the attenuation value. The input image is mapped on the ripple such that the amplitude of the ripple gradually changes in accordance with the distance from the attenuation standard position.

If the attenuation value is set to a value "1", and the offset value is weighted with such attenuation value, then the input image is mapped on a ripple such that the amplitude of the ripple or wave is kept to a constant value even when the distance from the attenuation standard position changes.

Furthermore, if the attenuation range is set to a portion of the area of the input image and the phase of the cyclic function is switched sequentially for each frame or field of the input image to produce the three-dimensional shape data representing the output image, then the input image is mapped on a rippling wave which, in the attenuation range, moves relative to the attenuation standard position.

If the attenuation range is set to include the whole area of the input image, then the input image is mapped on ripples such that as the wave produced at the attenuation standard position moves away therefrom, the amplitude becomes smaller, or as the wave moves toward the attenuation standard position, the amplitude becomes larger.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

(1) Image transforming apparatus

Figure 1:
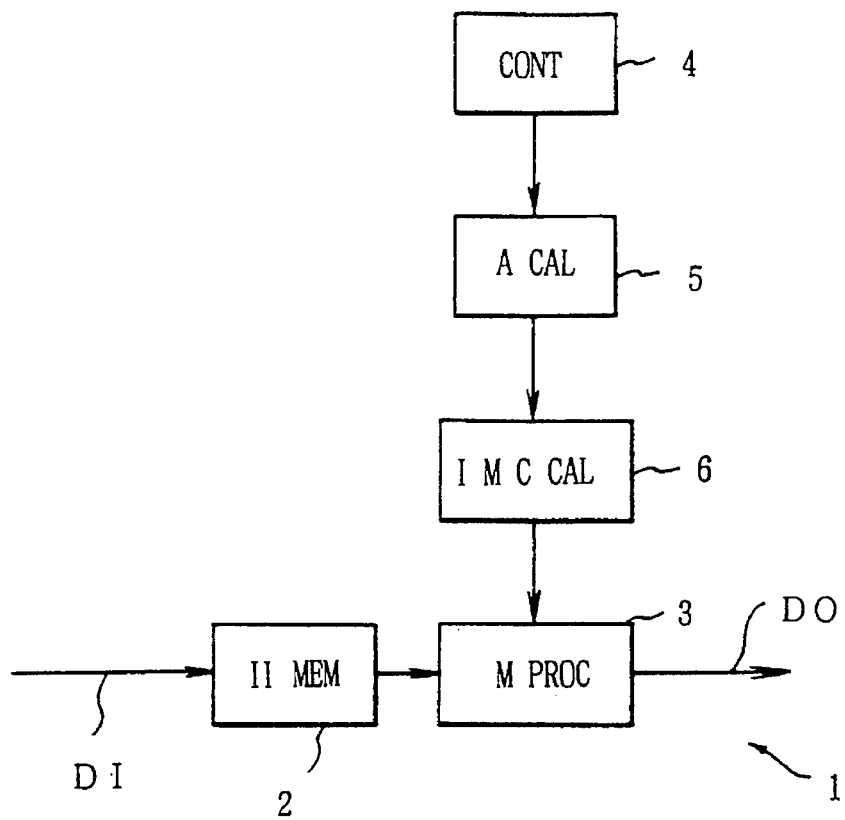
FIG. 1 is a block diagram showing one embodiment of the image transforming apparatus according to this invention.

FIG. 1 shows an image transforming apparatus 1 according to this invention. Sequentially inputted input image data DI is stored in the input image memory 2, and is read out at a predetermined timing and is supplied to a mapping processing circuit 3.

When the operator manipulates a controller 4 and the operation mode is selected, the parameters to be inputted are accepted depending on the operation mode, so that the shape selected by the operator is produced in accordance with these parameters.

In the address calculating part 5, the address of the input image data DI is transformed by a predetermined transform function in accordance with the input parameter delivered via the controller 4.

In accordance with the address (hereinafter, referred to as the "transform address"), an inverse mapping coefficient calculating part 6 generates an inverse mapping coefficient that is necessary for the mapping and supplies the inverse mapping coefficients to the mapping processing circuit 3.

The mapping processing circuit 3 maps the input image data DI supplied from the input image memory 2 in accordance with the inverse mapping coefficient. A two-dimensional flat output image data DO representing the input image data DI mapped onto the surface of the desired shape is thus obtained. That is, the mapping processing circuit 3 reads the two-dimensional image data from each address position of the input image memory 2 corresponding to each address position on the shape on the basis of the inverse mapping function and outputs the mapped data. This mapping process itself is known and is described in, for example, U.S. Pat. No. 5070465.

(2) Production of shape

The address calculating part 5 calculates a transfer address (X,Y,Z) from the input image address (x, y, z) by the following arithmetic operation:

$$X = R \times \frac{x - CX}{dist} \times \cos(A \times dist + P) \times At + x \quad (1)$$

$$Y = R \times \frac{Y - CY}{dist} \times \cos(A \times dist + P) \times At + y \quad (2)$$

$$Z = -R \cdot \sin(A \cdot dist + P) \cdot At + z \quad (3)$$

In this manner, the transforming address (X, Y, Z) is generated. In equations (1), (2) and (3), the values "CX" and "CY" represent the X and Y coordinates of the center position of the ripple, "R" represents the maximum amplitude of the wave, "A" represents the wavelength, and "P" represents the phase of the wave. Furthermore, the values "dist" and "At" are represented by following equations:

$$At = \exp\left\{ -\left\{ \frac{dist - Rc}{Rr} \right\}^2 \right\} \quad (4)$$

$$dist = [(x - CX)^2 + (y - CY)^2]^{1/2} \quad (5)$$

Wherein "Rc" represents the center position of the passing wave and is defined by the distance from the wave center represented by the values CX and CY; and "Rr" represents the range of the passing wave, that is the range of the wave centered at position Rc.

The address calculating part 5 executes the arithmetic processing of equations (1) to (5) in accordance with the above-described parameters which are supplied via the controller 4 to generate the desired shape of the wave.

(2-1) Production of a wave having no attenuation

By an operator inputting the ripple command to the controller 4, the image transforming apparatus 1 switches to the wave production mode, and the output of this wave surface production mode is displayed.

If the ripple-on menu item is selected, the image transforming apparatus 1 is switched to the 3D wave production mode to change the wave in real time. At this time, if the attenuation-on menu item is selected, animation is produced to attenuate the ripple.

When the menu of attenuation-on is not selected, however, the address calculating part 5 sets the value of the parameter At to "1" and produces the non-attenuated shape.

Figure 2:
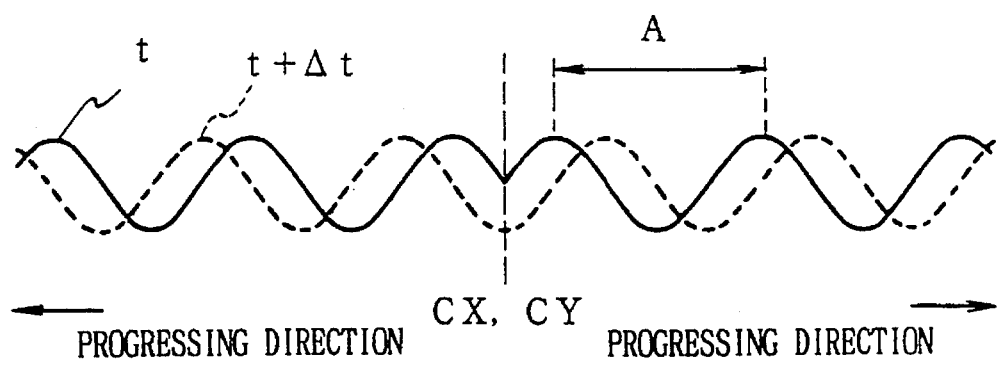
FIG. 2 is a schematic view showing a wave having no attenuation.
Figure 3:
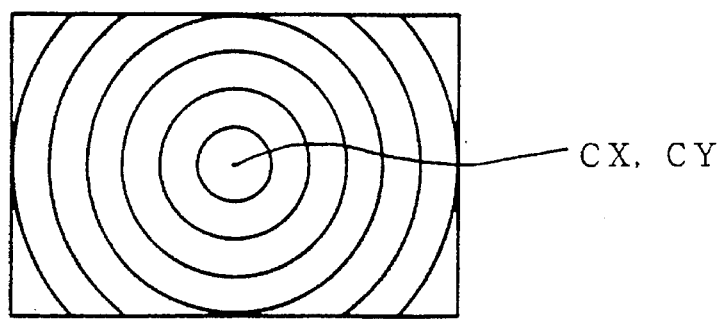
FIG. 3 is a schematic view illustrating the output image in the X–Y plane of a wave having no attenuation.

When the parameter At is set to a value of "1", the first terms of the equations (1), (2) and (3) each vary cyclically from the center CX and CY in each of the X and Y directions, as shown in FIG. 2. The coordinate of the address of the input image data DI is added to the first term so that the input address is offset by the offset value determined by the first term, to generate the output address. As shown in FIG. 3, a shape which looks like a ripple or wave spreading over the whole display from the center CX and CY is produced.

Accordingly, the mapping is executed using this transforming address (X, Y, Z) to produce the output image data DO which looks like a spreading ripple from the input image data DI.

The address calculating part 5 also detects the phase P for each field from the wave frequency inputted by the operator, and the phase P is substituted repeatedly into equations (1) to (3) and the above-described calculation is repeated to generate the phase change in the shape.

Therefore, the input image data DI is repeatedly mapped to this shape for each field so that the output image data DO, which looks like a ripple spreading outward from the center CX and CY, is produced from the input image data DI.

Alternatively, the change of phase P may occur in an inward direction, and the shape that is produced represents a wave that moves toward the center CX and CY. Further, the controller 4 is operable to set the wavelength ratio of the X and Y directions so that the address calculating part 5 generates the shape in accordance with this ratio. As an example, when the ratio is set to the value "1", the parameters of equations (1) and (2) define a shape such that the wave spreads in concentric circles. In contrast, when the ratio is set a value other than "1", the shape is defined such that the wave spreads as an ellipse.

More specifically, the address calculating part 5 executes the following arithmetic operation:

$$A = \frac{2\pi}{L} \quad (6)$$

and sets the wavelength A with respect to the wavelength which is represented by distance L on the display that has been inputted by the operator. Then, the wavelength A substituted into the equations (1) and (2) is switched in accordance with the ratio determined by the operator.

As a result, the image transforming apparatus 1 can generate animation that looks like a ripple spreading like an ellipse when so desired by operator.

Further, the image transforming apparatus 1, by having the angle changed and the inverse mapping coefficient changed, is able to show the spreading ripple from any desired angle.

(2-2) Production of wave having attenuation

If the operator selects the menu item of attenuation-on, the address calculating part 5 calculates using the equations (4) and (5) with the inputted parameters to determine the values At and dist, and, in turn, the equations (1) to (3) are calculated using the calculated parameter At.

Figure 4:
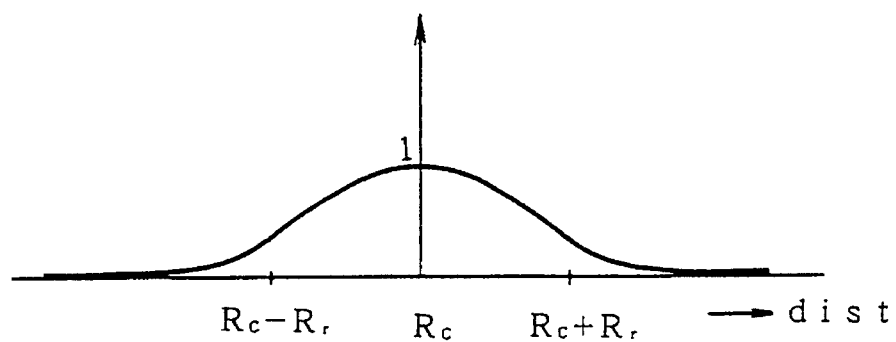
FIG. 4 is a characteristic curve diagram for the weighting of the offset value.

When the parameter "dist" in equation (4) has a value Rc, the value "1" is calculated for the parameter At, and the value of At reduces to "0" as the parameter value "dist" varies from the value Rc. Therefore, the characteristic of the parameter At is generally indicated by a normal distribution shown in FIG. 4.

The address calculating part 5 generates the transforming address (X, Y, Z) after weight processing with the parameter At as shown in equations (1) to (3). The address generating part 5 thus generates the shape of the wave such that the greater the parameter "dist" is from the value Rc, the more the wave is attenuated.

If the parameter Rc is set to the value "0", the parameter At has a maximum value (the value "1") at the center CX and CY so that the value of At reduces as the wave goes away from the center CX and CY.

Figure 5:
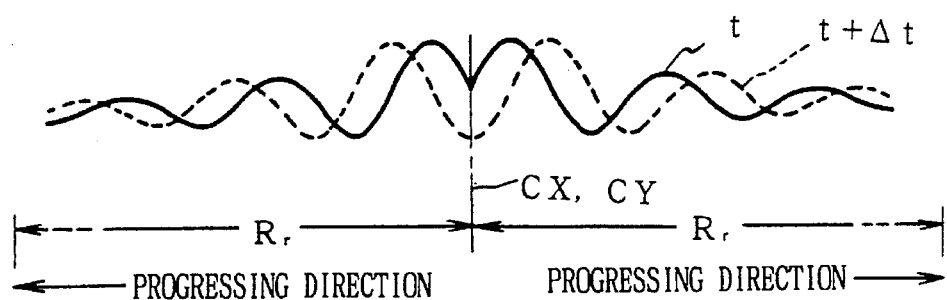
FIG. 5 depicts a wave having greater attenuation with increasing distance.
Figure 6:
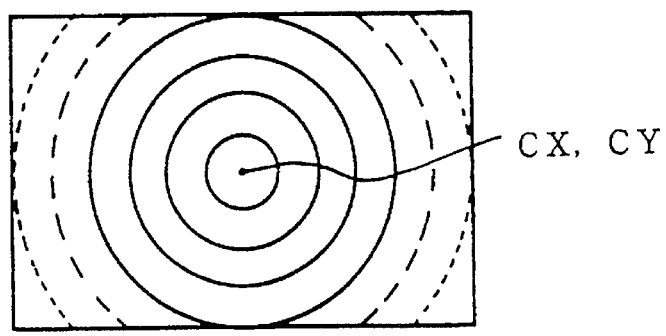
FIG. 6 illustrates the output image in the X–Y plane for a wave having greater attenuation with increasing distance.

As shown in FIGS. 5 and 6, the farther the wave travels from the center CX and CY, the more the amplitude of the wave is attenuated.

If the value Rr is large, the wave attenuates slowly with increasing distance from the center CX and CY. Thus, the same effect as when the parameter At has the value "1" is obtained.

In contrast, if the value Rr is small the wave attenuates rapidly with increasing distance from the center CX and CY. The value Rr can be set to any desired value to produce a desired, realistic looking ripple.

Further, by also setting the value of the parameter At and by having the value of phase P switched for each field unit, an animation is produced in which the waves go away from the center CX and CY, or the waves come up to the center CX and CY.

(2-3) Production of a wave oscillating at only a specific location.

Figure 7:
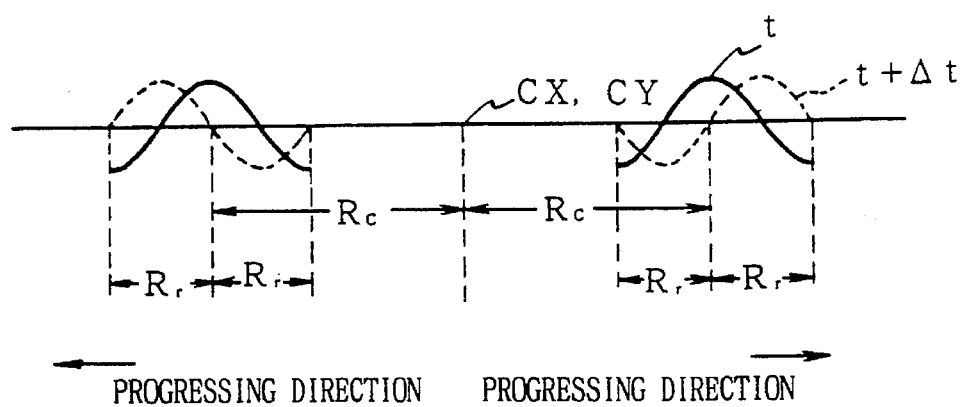
FIG. 7 is a schematic view showing the wave oscillating only in a specific location.

If the operator sets the parameter Rc to a value other than the value "0", the address calculating part 5 generates a shape in accordance with the equation (4) such that the distribution of the parameter At rises to a maximum value of "1" along a circular path having a radius Rc from the center CX and CY, as shown in FIG. 7.

Figure 8:
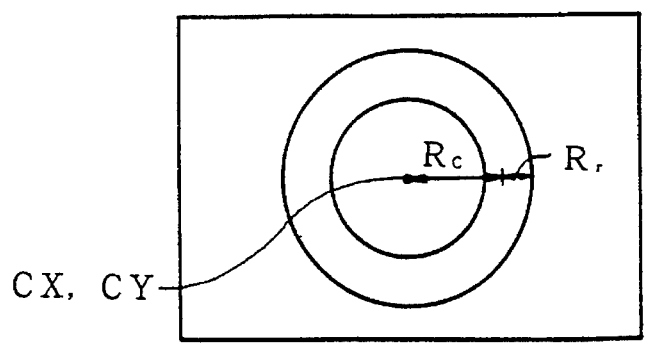
FIG. 8 is a schematic view illustrating the output image in the X–Y plane for a wave oscillating only in a specific location.

If the operator sets the value Rr to a smaller value than the value of the parameter Rc the address calculating part 5 varies the value of the parameter At such that the value falls in the region having the distance Rc±Rr from the center CX and CY as shown in FIG. 8.

Further, and similarly to the case shown in FIG. 2, the value of the phase P is set for each field of the input image in the address calculating part 5, and the arithmetic operations of equations (1) to (5) are performed using this value of the phase P so as to form the wave oscillating in only a region defined by concentric circles for the input image data DI. Thus, the operation is facilitated.

(2-4) Production of wave progressing with undetermined width.

If the operator selects a progressive wave mode, the address calculating part 5 sequentially inputs the speed of the progressive wave and the initial value of the value Rc.

Further, when the command of key frame is inputted, the address calculating part 5 sequentially updates the value Rc from the initial value. Therefore, a wave which progresses from the center CX and CY or a wave which approaches to the center CX and CY is formed.

Figure 9:
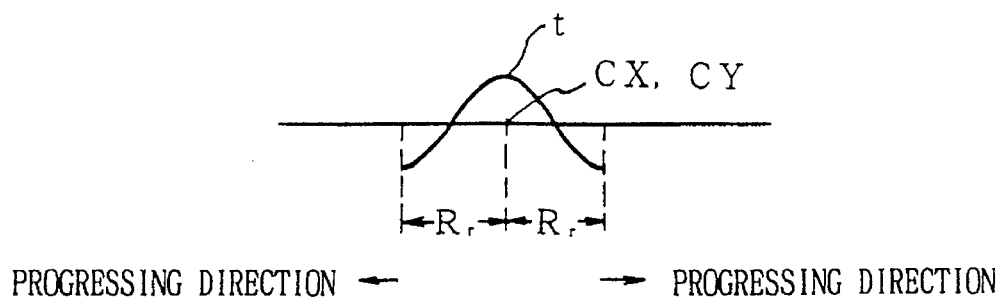
FIG. 9 is a schematic view showing the initial state of a wave progressing with undetermined width.
Figure 10:
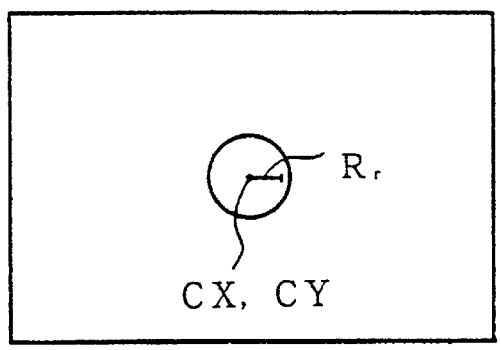
FIG. 10 is a schematic view illustrating the output image in the X–Y plane for an initial state of a wave progressing with undetermined width.

As shown in FIGS. 9 and 10, if the value "0" is inputted as the initial value of the value Rc, the address calculating part 5 sets the parameter At to have a maximum value of "1" at the center CX and CY as determined by the equation (4), and to decrease the value of At in the region having the radius Rr from the center CX and CY.

Thus, the shape of the wave is initially formed such that the wave rises only in the region having the distance Rr from the center CX and CY. The mapping is executed according to this shape.

The address calculating part 5 then updates the value of Rc based on the progression speed of the wave as inputted by the operator. The shape of the wave is formed for each field of the input image continuously.

Figure 11:
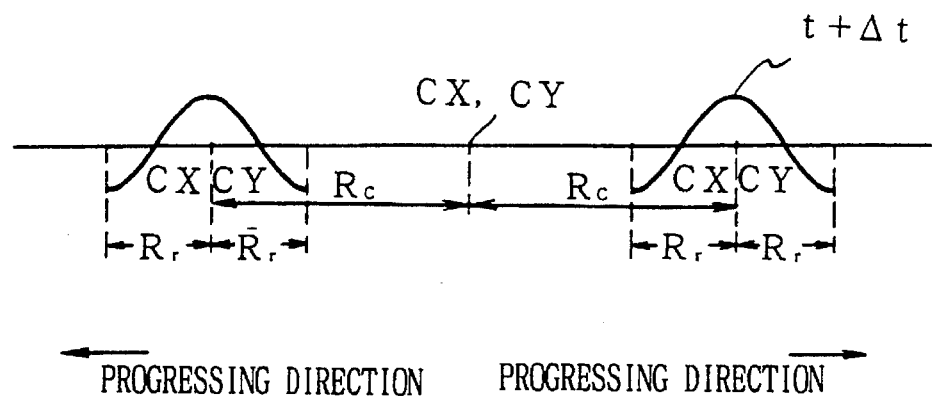
FIG. 11 is a schematic view showing a wave progressing with undetermined width after a predetermined time.
Figure 12:
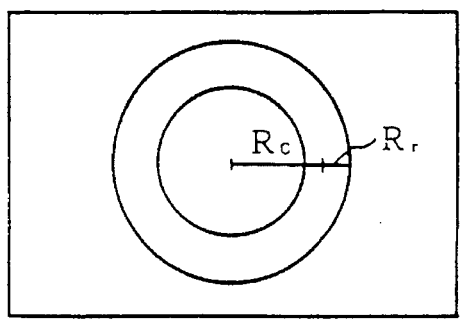
FIG. 12 is a schematic view illustrating the output image in the X–Y plane for a wave progressing with undetermined width after a predetermined time.

As shown in FIGS. 11 and 12, the region in which the parameter At rises grows with increasing time and extends over the region defined by the concentric circles Rc±Rr.

The address calculating part 5 also determines the phase P on the basis of the progressive wave speed, and the arithmetic operations using the equations (1) to (3) are executed by using this phase P.

Therefore, in the image transforming apparatus 1, a progressive wave is generated.

Further, by setting Rc to an arbitrary initial value other than "0", a traveling wave is produced in the region defined by the concentric circles having the circumference value Rc±Rr.

Further, by appropriately setting the value of the phase P and by decreasing the value Rc, a progressive wave converging on the center CX and CY is produced.

With the above apparatus and method, an offset value, which changes sinusoidally with the distance from the center is obtained. When the input address is added to this offset value and the transforming address is produced, the offset value is weight-processed so that the standard position, the range, etc. of this weight-processing are varied for producing variable waves or ripples.

Figure 13:
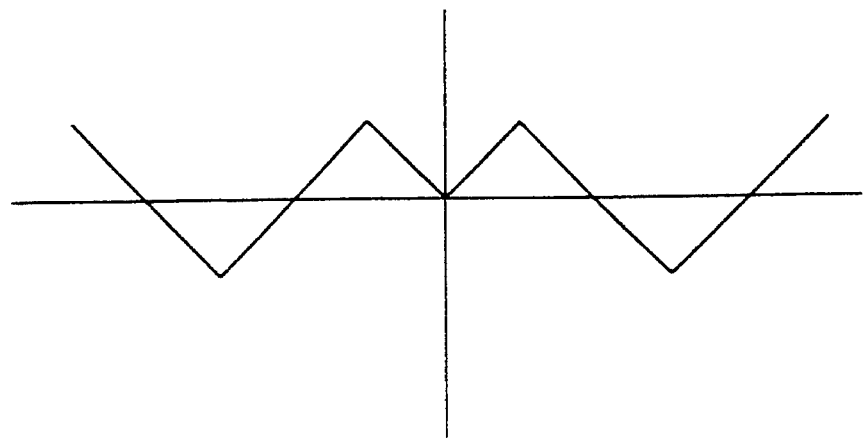
FIG. 13 is a characteristic curve diagram for when the offset value varies like a triangular wave.
Figure 14:
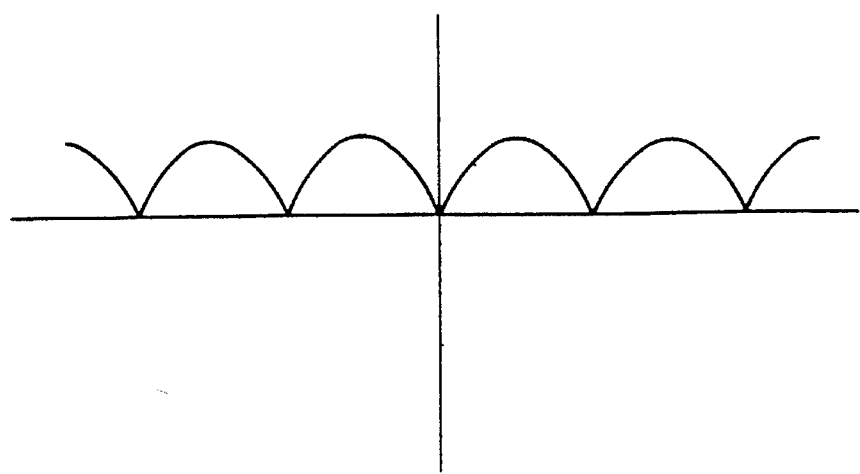
FIG. 14 is a characteristic curve diagram for when the offset value varies in accordance with absolute values of a sine-wave function.

Note that the embodiments discussed above have dealt with the example in which the offset value, which changes sinusoidally with the distance from the center, is produced. However, the present invention is not limited to this example, and the offset value can be made to have a triangle-wave shape shown in FIG. 13, or the offset value may vary in accordance with the absolute values of a sine-wave function so as to have a cycloidal-like variation, as shown in FIG. 14. That is, the cyclic function, whose value changes in accordance with the distance from the center is changed as needed to suit the production of the offset value.

Furthermore, note that the embodiments described above have dealt with the case where the wave is produced concentrically from the center position. However, this invention is not limited to that case but, for example, a standard position may be defined by a straight line extending in the direction X or Y so as to produce a ripple running parallel to this standard position or straight line.

According to the present invention, an offset value, which changes like a cyclic function in accordance with the distance from the standard position, is obtained, and when the input address is added to this offset value and the transforming address is produced, this offset value is weight-processed so that the standard position, the range of this weight-processing, etc. are switched to produce various ripples. Therefore, ease of operation of the image transforming apparatus can be obtained.

While preferred embodiments of the invention have been described herein, it will be obvious to those skilled in the art that various changes and modifications may be effected therein without departing from the true spirit and scope of the invention as defined in the appended claims.

What is claimed is:

1. An image transforming apparatus for transforming an input image into an output image by mapping the input image onto a shape which includes a wave having a center point and a direction of propagation extending therefrom, comprising:

means for generating offset values varying cyclically with increasing distance along said shape in said direction of propagation from said center point;

means for defining an attenuation standard position representing a location of minimum attenuation of said wave;

means for defining an attenuation range value corresponding to a rate at which the wave attenuates with increasing distance along said direction of propagation from said attenuation standard position;

means for generating an attenuation factor as a function of a distance along said direction of propagation from said attenuation standard position and of said attenuation range value for weighting said offset values to form respective weighted offset values;

means for generating transform address data representing said shape by adding the weighted offset values to address data representing respective locations on the input image; and means for forming the output image by mapping said input image onto said shape as a function of said input image data and said transform address data.

2. The image transforming apparatus of claim 1, wherein said means for generating an attenuation factor sets said attenuation factor to a value of "1" such that said means for forming the output image maps said input image onto said shape to represent an amplitude of said wave that is constant in respect to said distance from said attenuation standard position in said direction of propagation.

3. The image transforming apparatus of claim 1, wherein said means for defining an attenuation range value sets said attenuation range value such that said weighted offset values have non-zero values only within a predefined region of said input image; and said means for generating offset values defines respective phase coefficients for successive frames or fields of said input image to change said offset values such that said means for forming the output image maps said input image onto said shape to restrict propagation of said wave to within said predefined region and to cause said propagation to occur in one of an inward direction and an outward direction relative to said center point.

4. An apparatus according to claim 3, wherein said predefined region is an annular region having boundaries defined by two concentric circles that are centered at said center point.

5. The image transforming apparatus of claim 1, wherein said means for defining an attenuation range value maintains a constant attenuation range value; and said means for defining an attenuation standard position translates said attenuation standard position for each successive frame or field of said input image such that said means for forming the output image maps said input image onto said shape to represent propagation of said wave that corresponds to the translation of said attenuation standard position.

6. The image transforming apparatus of claim 1, wherein said means for defining an attenuation standard position sets said attenuation standard position to coincide with said center point so that said means for forming the image maps said input image onto said shape to represent an amplitude of said wave that decreases with increasing distance from said center point.

7. The image transforming apparatus of claim 1, wherein said means for forming the output image is comprised of input image memory means for storing said input image, means for generating an inverse mapping function as a function of said said transform address data, means for reading said address data representing said input image from each address position in the input image memory that corresponds to a respective address on said shape as a function of said inverse mapping function, and means for outputting said output image.

8. An apparatus according to claim 1, wherein said means for generating offset values causes said offset values to vary sinusoidally with increasing distances from the center point.

9. An apparatus according to claim 1, wherein said means for generating offset values causes said offset values to vary as a function of a triangular shaped wave with increasing distances from the center point.

10. An apparatus according to claim 1, wherein said means for generating offset values causes said offset values to vary in accordance with absolute values of a sine-wave function with increasing distances from the center point.

11. An apparatus according to claim 1, wherein said means for generating an attenuation factor causes said attenuation factor to decrease exponentially with increasing distance from said attenuation standard position.

12. An image transforming apparatus for transforming an input image into an output image by mapping the input image onto a shape which includes a wave having a center point and a direction of propagation extending therefrom, comprising:

means for generating offset values varying cyclically with increasing distance along said shape in said direction of propagation from said center point;

means for defining an attenuation standard position representing a location of minimum attenuation of said wave;

means for defining an attenuation range value corresponding to a rate at which the wave attenuates with increasing distance along said direction of propagation from said attenuation standard position;

means for selecting one of a first operating mode and a second operating mode;

means for generating, when said first operating mode is selected, an attenuation factor as a function of a distance along said direction of propagation from said attenuation standard position and of said attenuation range value and for generating, when said second operating mode is selected, an attenuation factor having a value of "1", said attenuation factor being employed, in each of said first and second operating modes, for weighting said offset values so as to from respective weighted offset values;

means for generating transform address data representing said shape by adding the weighted offset values to address data representing respective locations on the input image; and means for forming the output image by mapping said input image onto said shape as a function of said input image data and said transform address data to represent, when said first operating mode is selected, an amplitude of said wave that decreases as a function of said distance from said attenuation standard position, and to represent, when in said second operating mode, an amplitude of said wave that is constant in respect to said distance from said attenuation standard position.

13. A method of transforming an input image into an output image by mapping the input image onto a shape which includes a wave having a center point and a direction of propagation extending therefrom, comprising the steps of:

generating offset values varying cyclically with increasing distance along said shape in said direction of propagation from said center point;

defining an attenuation standard position representing a location of minimum attenuation of said wave;

defining an attenuation range value corresponding to a rate at which the wave attenuates with increasing distance along said direction of propagation from said attenuation standard position;

generating an attenuation factor as a function of a distance along said direction of propagation from said attenuation standard position and of said attenuation range value for weighting said offset values to form respective weighted offset values;

generating transform address data representing said shape by adding the weighted offset values to address data representing respective locations on the input image; and forming the output image by mapping said input image onto said shape as a function of said input image data and said transform address data.

* * * * *